B. B. WEST.
HEEL REST.
APPLICATION FILED SEPT. 21, 1912.
1,162,959. Patented Dec. 7, 1915.
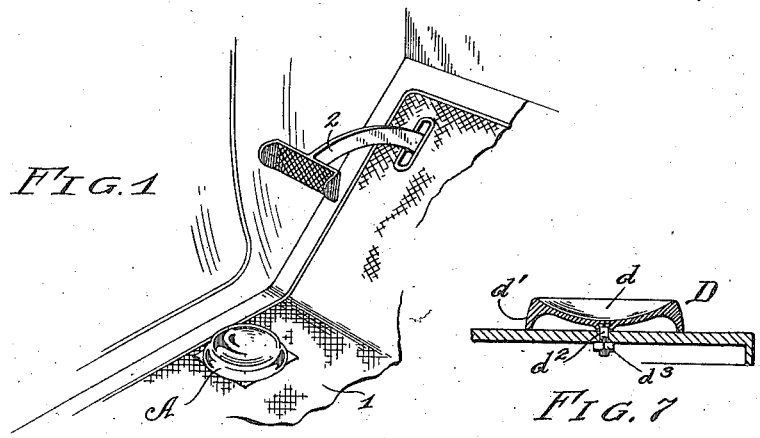
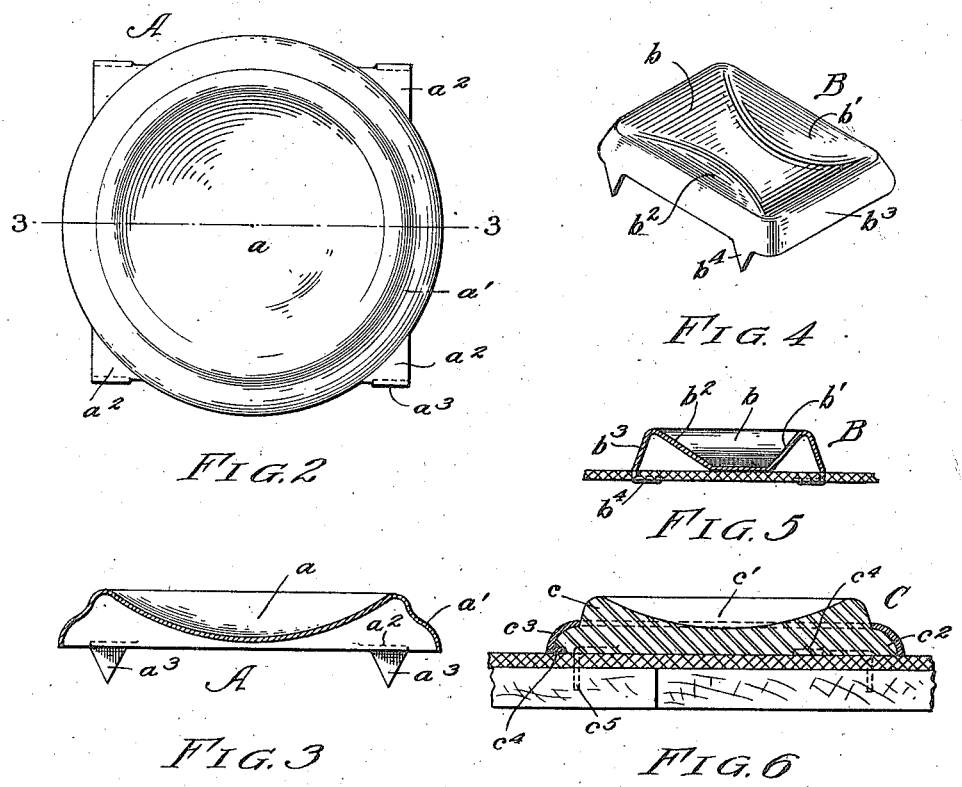
WITNESSES:
Hugh B. McGill
Irene L. Stohlman
INVENTOR,
Brennan B. West
BY Abell & Smith,
ATTYS.

UNITED STATES PATENT OFFICE.

BRENNAN B. WEST, OF CLEVELAND, OHIO.

HEEL-REST.

1,162,959. Specification of Letters Patent. Patented Dec. 7, 1915.

Application filed September 21, 1912. Serial No. 721,550.

*To all whom it may concern:*

Be it known that I, BRENNAN B. WEST, a citizen of the United States, residing at Cleveland, in the county of Cuyahoga and State of Ohio, have invented a certain new and useful Improvement in Heel-Rests, of which the following is a full, clear, and exact description, reference being had to the accompanying drawings.

This invention relates to heel rests for automobile drivers and has the two-fold purpose of protecting the floors or floor coverings of automobiles at points where they are subjected to the wearing action of the driver's shoe heel as he rests his foot upon the brake or clutch pedals or upon the accelerator lever, and of retaining the proper position of the driver's foot with respect to said pedals or lever; and its objects are to provide a device of this character that can be cheaply produced, is of neat and attractive appearance, which is of simple and substantial construction, is durable and which can be readily and very securely attached to the floor of an automobile or to the covering therefor (such as rubber matting or carpet) without the use of screws, nails or the like, and a further object is to provide a device of such shape that it will comfortably receive various sizes of shoe heels and retain the foot in proper relation to the pedal upon which it is intended to operate regardless of the swinging or bouncing of the automobile. These and further objects I attain in the device illustrated in the accompanying drawing forming a part hereof, wherein—

Figure 1 is a perspective view of a portion of an automobile floor in the vicinity of the brake pedal and having one of my heel rests applied thereto; Fig. 2 is a plan view of my heel rest; Fig. 3 is a sectional view thereof taken on the line 3—3 of Fig. 2; Figs. 4 and 5 are a perspective and cross sectional view, respectively, of a modified form of my heel rest, and Figs. 6 and 7 are further modifications of my invention.

In the drawings, 1 represents the floor of an automobile and 2 the brake pedal which projects through a slot in the inclined portion thereof. Secured to the horizontal portion of the floor 1, to the rear of and beneath the brake pedal 2, at a point where the driver's heel would most naturally rest when his foot is placed upon the brake pedal, is a heel rest A.

The heel rest A is formed, preferably, of a substantially circular piece of sheet metal which is depressed or concaved throughout its central portion, as shown at $a$, and turned downwardly at its edge to form a flange $a'$, the plane of the lower edge of which is slightly below the depressed central portion of the plate. Extending from four equally spaced points about the lower edge of this flange, in substantially the plane thereof, are triangular projections $a^2$. A prong $a^3$ depends from one edge of each of these projections, and has its flat sides parallel with the flat sides of the prongs which depend from the other triangular projection, for a purpose which will be mentioned hereinafter.

As is well known in all, or nearly all automobiles, it is necessary to have the flooring between the dash and the front seat, removable. This removable portion is either covered by a rubber mat, carpet or the like which may be lifted out when it is desired to remove the flooring, or each piece of the flooring may be permanently covered with a piece of linoleum, rubber matting or like material.

As I have previously mentioned, my heel rest is equally as well adapted for attachment to removable coverings for automobile floors as to the permanently covered floors. When it is desired to attach my heel rest to a removable floor covering, such as a rubber mat, the prongs may be pressed through the matting and clenched or turned inwardly on its underneath side, it being preferable to have the flat sides of the prongs extend transverse the direction of movement or pressure of the driver's heel, for the purpose of eliminating any tearing or cutting action the prongs might exert upon the matting, were they placed at right angles to this preferred position. When my heel rest is attached to a permanently covered floor, slits are made in the floor, as with the point of a knife, preferably extending with the grain of the wood from which the floor is made, and the prongs of the heel rest are pressed firmly into the slits until the flange $a'$ rests upon the surface of the floor. In this manner the heel rest is held securely in place. This operation is rendered easy because of the fact that the flat sides of all of the prongs are parallel and the slits in the floor aline with the grain of the wood.

In Figs. 4 and 5 of the drawing I have illustrated a modified form of my heel rest which is substantially rectangular in plan and which I designate B. In this form, the depressed or concaved portion $b$ is curved in a transverse direction with respect to the direction of movement of the foot for the purpose of positioning the driver's foot, but a cross-sectional view at right angles to this, such as I have shown in Fig. 5, reveals the fact that the front and rear walls of the depressed portion are straight and are inclined at different angles, the steeper being designated $b'$ and the other $b^2$. Surrounding the depressed portion is a depending flange $b^3$, the bottom edge of which is in a plane slightly below the bottom of the depressed central portion of the plate. Projecting downwardly from the flanges adjacent the inclined walls $b'$, $b^2$, near each of their ends, is a prong $b^4$. In this case, as in the former, it will be noticed that the flat sides of all of the prongs are parallel. The purpose of the different angle of inclination of the walls $b'$, $b^2$ will be apparent from the following facts. As a rule, the brake and clutch levers of automobiles stand at considerable of an elevation from the floor and require a forward movement of the foot to operate them. For that reason it is necessary for the driver's foot to stand at quite a steep angle from the floor. To accommodate this position of the foot, I have provided the wall $b'$ of my heel rest. The position of the foot required for coöperation with an accelerator lever or an exhaust cut out valve, either of which reposes at only a slight distance above the floor of an automobile and requires a downward pressure to operate them, is assured by the inclined wall $b^2$. Fig. 5 shows this form of my heel rest as applied to a removable floor covering by the clenching of its prongs on the underneath side thereof.

Fig. 6 illustrates a form of my invention which is similar in appearance to the form shown in Figs. 1 to 3, but differing in construction and material therefrom. In this form which I designate C, I use a block $c$ of rubber, wood, glass, or any material which will prove satisfactory for the purpose, and form it with a depressed central portion $c'$. Surrounding the bottom of the block is a flange or beading $c^2$ adapted to be received by a metallic ring $c^3$ converging toward its upper edge to conform to the shape of the block $c$ and having lugs $c^4$ projecting inwardly from its lower edge for the purpose of retaining the block within the ring. The ring $c^3$ is provided with triangular projections, from which depend prongs $c^5$, similar to those shown in my previously mentioned form. In this figure I have shown my heel rest as applied to a permanently covered floor, the prongs being pressed through the floor covering and into the floor.

To meet the requirements of a metal floor, I have provided the form of heel rest illustrated in Fig. 7 which I designate D and which I have shown as a casting, having a depressed or concaved central portion $d$ surrounded by a flange $d'$ adapted to rest upon the surface of the floor. The head of a screw $d^2$ is embedded in a boss depending from the underneath side of the depressed portion $d$ at its center. The screw $d^2$ is adapted to project through a hole in the floor and receive a nut $d^3$ for holding the heel rest securely in place.

Having thus described my invention, what I claim is:—

1. A heel rest comprising a plate having a depressed central portion, a depending flange surrounding said depressed portion, projections extending from said flange, and prongs depending from said projections.

2. A heel rest comprising a substantially circular plate having a depressed or concaved central portion, a flange of a height greater than the depth of the depressed portion and depending from the outer edge thereof, projections extending laterally from the flange, and prongs depending from the projections.

3. A heel rest comprising a substantially circular plate having a depressed central portion, a flange depending from the outer edge of said depressed portion, the plane of the lower edge of the flange being slightly below the depressed portion, projections extending from the lower edge of the flange in substantially the plane thereof, and a flat prong depending from each projection, the flat sides of all of the prongs being parallel.

4. A heel rest comprising a substantially circular plate having a depressed central portion, a flange depending from the outer edge of said depressed portion, the plane of the lower edge of the flange being slightly below the depressed portion, projections extending from the lower edge of the flange in substantially the plane thereof, and a prong depending from each projection.

5. A heel rest comprising a plate having a depressed or concaved central portion, a flange of a height greater than the depth of the depressed portion depending from the outer edge thereof, and means for securing the plate to a surface.

6. A heel rest comprising a body portion, the sides of which flare downwardly and outwardy from its upper surface, a metallic member surrounding said body portion the sides of which converge from its lower to its upper edge, and means for securing said member to a surface.

In testimony whereof, I hereunto affix my signature in the presence of two witnesses.

BRENNAN B. WEST.

Witnesses:
J. B. HULL,
ALBERT H. BATES.